(12) United States Patent
Chen et al.

(10) Patent No.: US 9,253,240 B2
(45) Date of Patent: *Feb. 2, 2016

(54) PROVIDING SEQUENCE DATA SETS FOR STREAMING VIDEO DATA

(71) Applicant: QUALCOMM Incorporated, San Diego, CA (US)

(72) Inventors: Ying Chen, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 177 days.
This patent is subject to a terminal disclaimer.

(21) Appl. No.: 13/945,725

(22) Filed: Jul. 18, 2013

(65) Prior Publication Data
US 2013/0304935 A1 Nov. 14, 2013

Related U.S. Application Data

(62) Division of application No. 12/840,020, filed on Jul. 20, 2010.

(51) Int. Cl.
*H04L 29/06* (2006.01)
*H04N 7/173* (2011.01)
(Continued)

(52) U.S. Cl.
CPC ............ *H04L 65/607* (2013.01); *H04N 21/235* (2013.01); *H04N 21/2381* (2013.01);
(Continued)

(58) Field of Classification Search
CPC ............ H04N 21/235; H04N 21/2381; H04N 21/435; H04N 21/43615; H04N 21/4363; H04N 21/64322; H04N 21/84; H04N 21/8451; H04N 21/85406; H04N 21/4381; H04L 65/607
USPC .................................................. 375/240.26
See application file for complete search history.

(56) References Cited

U.S. PATENT DOCUMENTS 7,725,593 B2    5/2010  Visharam et al.
2004/0006575 A1  1/2004  Visharam et al.
(Continued)

FOREIGN PATENT DOCUMENTS

CN    1666195 A    9/2005
CN    1984329 A    6/2007
(Continued)

OTHER PUBLICATIONS

Amon P et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.
(Continued)

*Primary Examiner* — Hee-Yong Kim
(74) *Attorney, Agent, or Firm* — Brent Boyd

(57) ABSTRACT

A device may encapsulate video data such that Supplemental Enhancement Information (SEI) messages are stored separately from a sequence of coded video pictures described by the SEI messages. An example device includes a control unit configured to generate one or more SEI messages separate from the coded video pictures, wherein the SEI messages describe respective ones of the sequence of coded video pictures and include elements common to more than one of the coded video pictures, and an output interface configured to output the SEI messages separately from the sequence of coded video pictures. An example destination device may receive the SEI messages separately from the coded video pictures and render the coded video pictures using the SEI messages.

18 Claims, 7 Drawing Sheets

(51) Int. Cl.

| | |
|---|---|
| H04N 5/04 | (2006.01) |
| H04N 7/12 | (2006.01) |
| H04N 11/02 | (2006.01) |
| H04N 11/04 | (2006.01) |
| H04N 21/235 | (2011.01) |
| H04N 21/2381 | (2011.01) |
| H04N 21/435 | (2011.01) |
| H04N 21/436 | (2011.01) |
| H04N 21/4363 | (2011.01) |
| H04N 21/438 | (2011.01) |
| H04N 21/643 | (2011.01) |
| H04N 21/84 | (2011.01) |
| H04N 21/845 | (2011.01) |
| H04N 21/854 | (2011.01) |

(52) U.S. Cl.
CPC ......... *H04N21/435* (2013.01); *H04N 21/4363* (2013.01); *H04N 21/4381* (2013.01); *H04N 21/43615* (2013.01); *H04N 21/64322* (2013.01); *H04N 21/84* (2013.01); *H04N 21/8451* (2013.01); *H04N 21/85406* (2013.01)

(56) References Cited

U.S. PATENT DOCUMENTS

| | | | |
|---|---|---|---|
| 2004/0010802 A1* | 1/2004 | Visharam et al. ............... | 725/95 |
| 2004/0012510 A1 | 1/2004 | Chen | |
| 2005/0175098 A1 | 8/2005 | Narasimhan et al. | |
| 2006/0114988 A1 | 6/2006 | Gomila et al. | |
| 2006/0165298 A1 | 7/2006 | Kikuchi | |
| 2006/0277316 A1 | 12/2006 | Wang et al. | |
| 2008/0019446 A1 | 1/2008 | Hannuksela | |
| 2008/0101456 A1 | 5/2008 | Ridge et al. | |
| 2008/0225116 A1 | 9/2008 | Kang et al. | |
| 2009/0147860 A1 | 6/2009 | Pandit et al. | |
| 2010/0238994 A1 | 9/2010 | Cakareski et al. | |
| 2011/0119394 A1 | 5/2011 | Wang et al. | |
| 2011/0228166 A1* | 9/2011 | Le Leannec et al. ......... | 348/500 |
| 2012/0023249 A1 | 1/2012 | Chen et al. | |
| 2012/0189049 A1 | 7/2012 | Coban et al. | |

FOREIGN PATENT DOCUMENTS

| | | |
|---|---|---|
| CN | 101218828 A | 7/2008 |
| JP | 2004343272 A | 12/2004 |
| JP | 2008502171 A | 1/2008 |
| JP | 2008536420 A | 9/2008 |
| JP | 2009543386 A | 12/2009 |
| WO | 2005120060 A1 | 12/2005 |
| WO | WO-2006108917 A1 | 10/2006 |
| WO | 2007112384 A2 | 10/2007 |
| WO | 2009040723 A2 | 4/2009 |
| WO | 2010007513 A1 | 1/2010 |

OTHER PUBLICATIONS

Bross, et al., "High Efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE Jul. 11-20, 2012, JCTVC-J1003_d7, pp. 261.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghia, CN Oct. 10-19, 2012, JCTVC-K1003_v7, pp. 290.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chen et al., "Response to the CfP on HTTP Streaming: Adaptive Video streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.

Co-pending U.S. Appl. No. 13/748,291, filed Jan. 23, 2013.

David Singer, et al., "ISO/IEC 14496-15/FDIS, International Organization for Standardization Organization Internationale De Normalization ISO/IEC JTC1/SC29/WG11 Coding of Moving Pictures and Audio", ISO/IEC 2003, Aug. 11, 2003, pp. 1-34.

Digital cellular telecommunications system (Phase 2+); Universal Mobile Telecommunications System (UMTS); LTE; Transparent end-to-end packet switched streaming service (PSS); 3GPP file format (3GP) (3GPPP TS 26.44 version 9.2.0 Release 9), Technical Specification, European Telecommunications Standards Institute (ETSI), 650, Route des Lucioles ; F-06921 Sophia-Antipolis ; France, vol. 3GPP SA 4, No. V9.2.0, Jun. 1, 2010, XP014047292.

DVB Organization: "29n112624.doc", DVB, Digital Video Broadcasting, C/0 EBU 17A Ancienne Route—CH-1218 Grand Sac0nnex, Geneva—Switzerland, May 28, 2010, XP017831125.

Information Technology—Coding of audio-visual object—Part 15: Advanced Video Coding (AVC) file format, Amendment 1: Sub-track definitions, ISO/IEC JTC 1/SC 29, ISO/IEC 14496-15:2010/Amd. 1:2011(E), Jul. 22, 2011, 16 pp.

International Search Report and Written Opinion—PCT/US2011/044742, ISA/EPO—Oct. 27, 2011.

International Standard ISO/IEC 13818-1:2000(E), "Information Technology—Generic Coding of Moving Pictures and Associated Audio Information: Systems," Second edition, Dec. 1, 2000, pp. 1-174.

International Standard ISO/IEC 14496-12, Information Technology—Coding of audio-visual objects—Part 12: ISO base media file format, Third Edition, Oct. 15, 2008, 120 pp.

"International Standard ISO/IEC 14496-12 Information technology Coding ofaudio-visual objects Part 12: ISO basemedia file format", Internet Citation, Oct. 1, 2005, pp. 1-84, XP007914375, Retrieved from the Internet:URL:http://www.iso.org/iso/iso_catalogue/catalogue_ics/catalogue_detail_ics.htm?csnumber=41828 [retrieved on Aug. 11, 2010].

"ISO/IEC 14496-15:2004 Information technology—Coding of audio-visual objects—Part 15: Advanced Video Coding (AVC) file format", International Standard ISO/IEC, XX, XX, vol. 14496-15, Apr. 15, 2004, pp. 1-23, XP009157819, pp. 11-14.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

"Joint Draft 8.0 on Multiview Video Coding", 28th JVT meeting, Hannover, Germany, Document: JVT-AB204 (rev.1), Jul. 2008. available from http:// wftp3. itu.int/av-arch/jvt-site/2008_07_Hannover/JVT-AB204.

Schierl T, "Text of ISO/IEC 13818-1:2007/FPDAM 4—Transport of Multiview Video over ITU-T Rec H.222.0 | ISO/IEC 13818-1", ISO/IEC 13818-1:2007/FPDAM 4, Lausanne, Switzerland, 2009, pp. 1-21.

Schwarz et al., "Overview of the Scalable Video Coding Extension of the H.264/AVC Standard", IEEE Transactions on Circuits and Systems for Video Technology, Sep. 1, 2007, pp. 1103-1120, vol. 17, No. 9, IEEE Service Center, XP011193019, ISSN: 1051-8215, DOI: 10.1109/TCSVT.2007.905532.

Study Text of ISO/IEC 14496-10-2005/FPDAM3 Scalable Video Coding, 78 MPEG Meeting; Oct. 23, 2006-Oct. 27, 2006; Hangzhou; (Motion Pictureexpert Group or ISO/IEC JTC1/SC29/WG11), No. N8455, Nov. 10, 2006, XP030014947, ISSN: 0000-0336.

(56) References Cited

OTHER PUBLICATIONS

Sullivan et al., "Editors' draft revision to ITU-T Rec. H.264 | ISO/IEC 14496-10 Advanced Video Coding—in preparation for ITU-T SG 16 AAP Consent (in integrated form)", Joint Video Team (JVT) of ISO/IEC MPEG & ITU-T VCEG (ISO/IEC JTC1/SC29/WG11 and ITU-T SG16 Q.6) 30th Meeting: Geneva, CH Jan. 29-Feb. 3, 2009, pp. 1-683.

Thomas Rathgen et al., "Proposal for SVC File Format Specification", 73 MPEG Meeting; Jul. 25, 2005-Jul. 29, 2005; POZNAN; (Motion Picture Expert Group or ISO/IEC JTC1/SC29/WG11), No. M12345, Jul. 20, 2005, XP030041029, ISSN: 0000-0244.

Thomas Wiegand, et al., "Joint Draft ITU-T Rec. H.264 | ISO/IEC 14496-10/Amd.3 Scalable video coding", Joint Video Team (JVT) of ISO/IEC MPEG & ITU-T VCEG (ISO/IEC JTC1/SC29/WG11 and ITU-T SG16 Q.6) 24th Meeting: Geneva, Switzerland, Jun. 29-Jul. 5, 2007, pp. 1-559.

Wenger, et al., RFC 3984, "RTP Payload for H.264 Video," Feb. 2005, 84 pp.

Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].

Wiegand, T., et al., "WD3: Working Draft 3 of High-Efficiency Video Coding," Document JCTVC-E603, 5th Meeting: Geneva, CH, Mar. 16-23, 2011,pp. 193.

Wiegand, T., et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

3rd Generation Partnership Project;Technical Specification Group Services and System Aspects; Transp, 3GPP TSG-SA4 Meeting #59, 3GPP TSG SA WG4 ISO/IEC JTC1/SC29/WG11 (MPEG), Jun. 23, 2010, 6 Pages, Retrived from Internet: URL: http://www.3gpp.org/FTP/tsg_sa/WG4_CODEC/TSGS4_59/Docs/S4-100511.zip.

3rd Generation Partnership Project;Technical Specification Group Services and System Aspects;Transpa, 3GPP TS 26.234, 3GPP TS 26.244, 3GPP TSG SA WG4 ISO/IEC JTC1/SC29/WG11 (MPEG), Jun. 23, 2010, pp. 85-102, Retrived from Internet: URL, http://www.3gpp.org/ftp/TSG_SA/WG4_CODEC/TSGS4_59/Docs/S4-100511.zip.

Recommendation H.264, Advanced Video Coding for Generic Audiovisual Services, Oct. 26, 2009,P.327-P.368,560-593,628-645,URL,https://www.itu.int/rec/dologin_pub.asp?lang=e&id=T-REC-H.264-200903-S!!PDF-E&type=items.

\* cited by examiner

PROVIDING SEQUENCE DATA SETS FOR STREAMING VIDEO DATA

CLAIM OF PRIORITY UNDER 35 U.S.C. §120

This present Application is a divisional application of U.S. Ser. No. 12/840,020, filed Jul. 20, 2010, the disclosure which is assigned to the assignee hereof and expressly incorporated herein by reference.

TECHNICAL FIELD

This disclosure relates to transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

Efforts have been made to develop new video coding standards based on H.264/AVC. One such standard is the scalable video coding (SVC) standard, which is the scalable extension to H.264/AVC. Another standard is the multi-view video coding (MVC), which has become the multiview extension to H.264/AVC. A version of the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009," available from http://wftp3.itu.int/av-arch/jvt-site/2009_01_Geneva/JVT-AD007.zip. This document integrates SVC and MVC in the AVC specification.

SUMMARY

In general, this disclosure describes techniques for providing sequence data sets that describe coded video pictures of a video file, e.g., to support streaming of the video file according to HTTP streaming. The sequence data sets may include, for example, sequence parameter sets, picture parameter sets, and some Supplemental Enhancement Information (SEI) messages, such as, for example, sequence level SEI messages. These techniques may include decoupling the sequence data sets from the coded video pictures described by the sequence data sets. That is, rather than including sequence level SEI messages with coded video pictures described by the sequence level SEI messages, the techniques of this disclosure may include decoupling the sequence level SEI messages from the coded video pictures. Accordingly, the sequence level SEI messages may be transferred from a source device to a destination device separately from the coded video pictures. In some examples, a sequence data set including the sequence level SEI messages may be transferred from the source device to a destination device before transfer of the coded video pictures to which the sequence data sets pertain.

In one example, a method of outputting encapsulated video data includes generating one or more supplemental enhancement information (SEI) messages separate from the coded video pictures, wherein the SEI messages describe respective ones of the sequence of coded video pictures and include elements common to more than one of the coded video pictures, and outputting the SEI messages separately from the sequence of coded video pictures.

In another example, an apparatus for outputting encapsulated video data includes a control unit configured to generate one or more supplemental enhancement information (SEI) messages separate from the coded video pictures, wherein the SEI messages describe respective ones of the sequence of coded video pictures and include elements common to more than one of the coded video pictures, and an output interface configured to output the SEI messages separately from the sequence of coded video pictures.

In another example, an apparatus for outputting encapsulated video data includes means for generating one or more supplemental enhancement information (SEI) messages separate from the coded video pictures, wherein the SEI messages describe respective ones of the sequence of coded video pictures and include elements common to more than one of the coded video pictures, and means for outputting the SEI messages separately from the sequence of coded video pictures.

In another example, a computer program product includes a computer-readable storage medium comprises instructions that, when executed, cause a processor of a source device for outputting encapsulated video data to generate one or more supplemental enhancement information (SEI) messages separate from the coded video pictures, wherein the SEI messages describe respective ones of the sequence of coded video pictures and include elements common to more than one of the coded video pictures, and output the SEI messages separately from the sequence of coded video pictures.

In another example, a method of receiving encoded video data includes receiving Supplemental Enhancement Information (SEI) messages that describe a sequence of coded video pictures of a video file, wherein the SEI messages describe respective ones of the sequence of coded video pictures and include elements common to more than one of the coded video pictures, receiving the sequence of coded video pictures of the video file separately from the SEI messages, and rendering the sequence of coded video pictures based on the SEI messages after the sequence of coded video pictures has been decoded.

In another example, an apparatus for receiving encoded video data includes a control unit configured to receive Supplemental Enhancement Information (SEI) messages that describe a sequence of coded video pictures of a video file, wherein the SEI messages describe respective ones of the sequence of coded video pictures and include elements common to more than one of the coded video pictures, and to receive the sequence of coded video pictures of the video file separately from the SEI messages, and a video output configured to render the sequence of coded video pictures after the sequence of coded video pictures has been decoded.

In another example, an apparatus for receiving encoded video data includes means for receiving Supplemental Enhancement Information (SEI) messages that describe a sequence of coded video pictures of a video file, wherein the SEI messages describe respective ones of the sequence of coded video pictures and include elements common to more than one of the coded video pictures, means for receiving the sequence of coded video pictures of the video file separately from the SEI messages, and means for rendering the sequence of coded video pictures based on the SEI messages after the sequence of coded video pictures has been decoded.

In another example, a computer program product includes a computer-readable storage medium comprises instructions that cause a processor of a destination device for receiving encoded video data to receive Supplemental Enhancement Information (SEI) messages that describe a sequence of coded video pictures of a video file, wherein the SEI messages describe respective ones of the sequence of coded video pictures and include elements common to more than one of the coded video pictures, receive the sequence of coded video pictures of the video file separately from the SEI messages, and render the sequence of coded video pictures based on the SEI messages after the sequence of coded video pictures has been decoded.

The details of one or more examples are set forth in the accompanying drawings and the description below. Other features, objects, and advantages will be apparent from the description and drawings, and from the claims.

DETAILED DESCRIPTION

Figure 1:
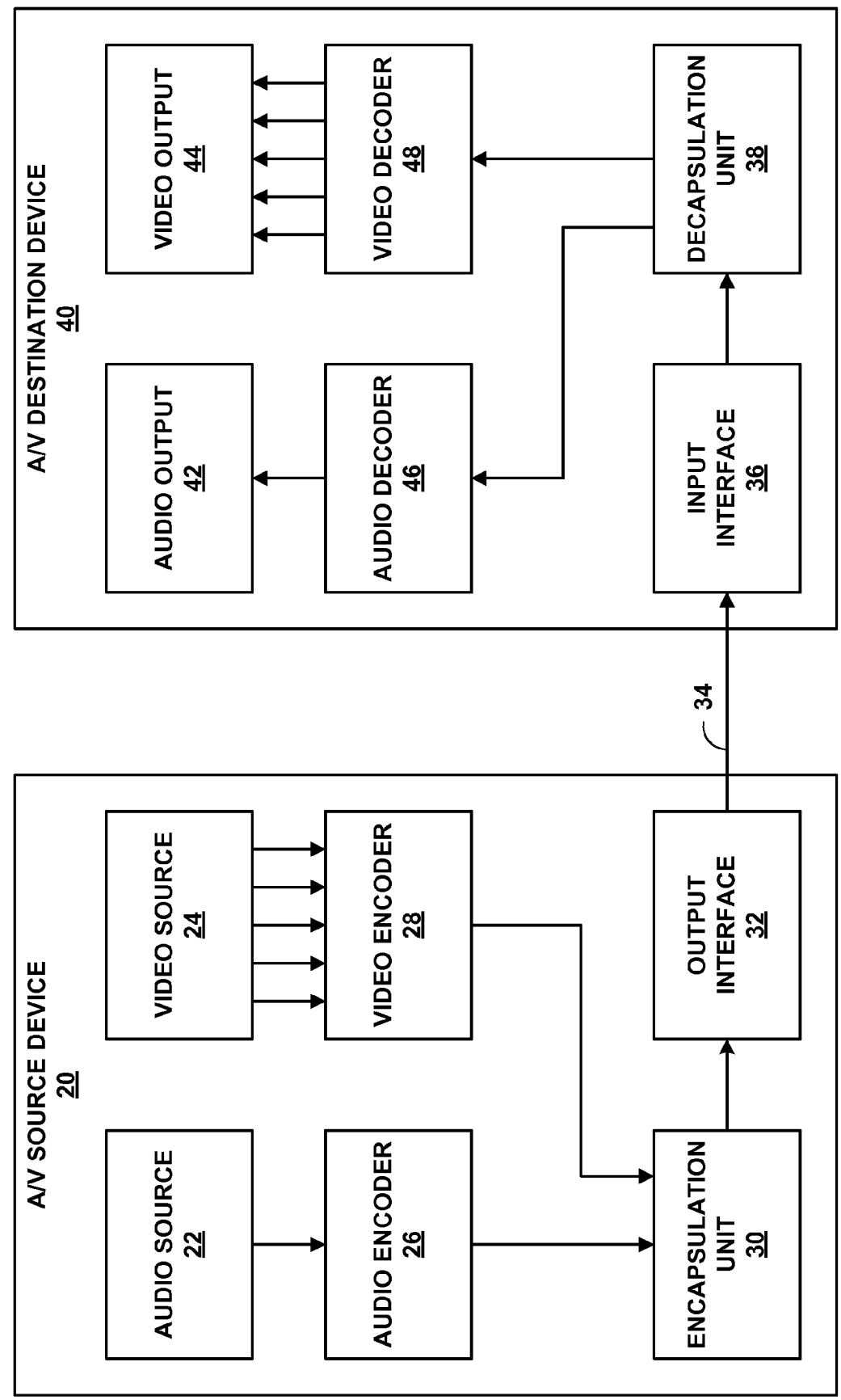
FIG. 1 is a block diagram illustrating an example system in which an audio/video (A/V) source device transfers audio and video data to an A/V destination device.

In general, this disclosure describes techniques for supporting the delivery of video data using a streaming network protocol, such as hypertext transfer protocol (HTTP) Streaming. In particular, the techniques of this disclosure are directed to decoupling certain Supplemental Enhancement Information (SEI) messages, such as sequence level SEI messages, from particular video samples when transmitting video data, e.g., in the form of a video file. Additionally, the techniques may include interpreting sequence level SEI messages at a destination device to support decoding and rendering of encoded video pictures.

The disclosure also describes decoupling SEI messages from video samples in the codec level, where the SEI messages do not necessarily need to be associated with specific coded pictures, e.g., when the SEI messages are associated with access units. In case the SEI messages are decoupled from coded pictures, the timing information specifying which duration an SEI message is applicable to, may be signaled as part of the SEI message.

SEI messages may contain information used to assist a decoder and/or renderer to decode and/or display certain encoded video pictures. SEI messages may also be used to provide error resilience. Some SEI messages are sequence level (e.g., relate to a coded group of pictures (GOP) or other sequence of coded video pictures), while others may relate to a particular coded picture. SEI messages are typically transmitted with a particular coded picture. That is, to retrieve an SEI message, a decoder ordinarily needs to retrieve the coded picture that includes the SEI message. Where the decoder does not need the data for the coded picture, this generally leads to wasted bandwidth. Moreover, in some cases, two SEI messages for different coded pictures or two GOPs may contain essentially the same information, such that transmitting the SEI messages repeatedly may cause a waste of bandwidth as well.

The techniques of this disclosure include transmitting SEI messages separately (e.g., independently) of coded video data, e.g., where the SEI messages describe sequence data for a sequence of coded video pictures. The sequence data may correspond to data that is common to the sequence of coded video pictures. In some examples relating to H.264/AVC (Advanced Video Coding), SEI messages may be transmitted along with a parameter set elementary stream when the SEI messages include information relating to pan-scan rectangles and stereo video information. The parameter set elementary stream may include sequence parameter set (SPS) and/or picture parameter set (PPS) messages. That is, the parameter set elementary stream may include PPS and/or SPS messages in addition to one or more SEI messages, in accordance with these techniques. One example of such an SEI message in H.264/AVC is a frame packing arrangement SEI, which specifies information on how two views of an image pair are interleaved together into one frame. As another example, with respect to scalable video coding (SVC), the SEI messages may be sent in a parameter set elementary stream when the SEI messages provide scalability information. As still another example, in multiview video coding (MVC), SEI messages may be included in the parameter set elementary stream when the SEI messages include view scalability information, multiview acquisition information, and/or multiview scene information.

Conventional sequence level SEI messages have been associated with certain access units, such as an access unit comprising an instantaneous decoder refresh (IDR) picture. However, the techniques of this disclosure are directed to separating sequence level SEI messages from access units. Accordingly, rather than retrieving an access unit including a sequence level SEI message, the techniques of this disclosure may enable a client device to retrieve the sequence level SEI messages separately from coded video pictures described by the sequence level SEI messages. Therefore, if the client device is configured to decode and display only a portion of a sequence of coded video pictures, the client device may retrieve only the portion of the sequence, without needing to retrieve other pictures, such as the IDR picture with which the SEI messages would otherwise be included. The client device may retrieve the SEI messages separately from the desired portion of coded video pictures, in accordance with the techniques of this disclosure.

In some examples, rather than including sequence level SEI messages (and/or other sequence data) in a parameter set track, the sequence level SEI messages may instead be included continuously in a file, such that an HTTP-Get operation can be used by a client to retrieve information that can be used to decode and display a video file at any point. That is, a user may seek to any point in a video file, and the decoder may retrieve the SEI messages without retrieving additional, unnecessary coded video data, e.g., coded video data that precedes a temporal location within a video file corresponding to the seek request and that would not be used to decode video data at and beyond the temporal location of the seek request A video or audio representation may include one or more segments. Each representation may contain an initialization segment, or each media segment in the representation may be self-initializing. An Initialization Segment may contain initialization information for accessing data of the corresponding representation, e.g., media segments described by the initialization segment. Initialization segments generally do not contain any media data, but instead may include only initialization data. Each representation may include one or more media components, where each media component may be an encoded version of an individual media type such as audio, video, or timed text. Media components may be time-continuous across boundaries of consecutive media segments within one representation.

As yet another example, the techniques of this disclosure may include sending sequence data (e.g., PPS, SPS, and sequence level SEI messages) and, in particular, file segments that do not contain coded video data, namely video samples. A source device and a destination device may be configured with locations of the video samples including the sequence data, and/or with methods for determining locations for these video samples. Sequence data may, in some examples, be sent from a server to a client before encoded video data is sent. That is, a source device may provide sequence data, such as PPS, SPS, and sequence level SEI messages, to a client device before sending encoded video data referenced by the sequence data. In HTTP streaming based on file segments, SEI messages, e.g., sequence level SEI messages, together with parameter sets, such as sequence parameter sets and picture parameter sets can be placed in an initialization segment, which does not contain any coded audio or video sample.

The techniques of this disclosure may be applied to video files conforming to any of ISO base media file format, Scalable Video Coding (SVC) file format, Advanced Video Coding (AVC) file format, Third Generation Partnership Project (3GPP) file format, and/or Multiview Video Coding (MVC) file format. The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format.

3GPP file format and MVC file format are extensions of the AVC file format. ISO base media file format contains the timing, structure, and media information for timed sequences of media data, such as audio-visual presentations. The file structure is object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) contains the metadata of the media and the video and audio frames are contained in the media data container and could be in other files.

A presentation (motion sequence) may be contained in several files. Timing and framing (position and size) information is generally in the ISO base media file and the ancillary files may essentially use any format. This presentation may be 'local' to the system containing the presentation, or may be provided via a network or other stream delivery mechanism.

The files may have a logical structure, a time structure, and a physical structure, and these structures are not required to be coupled. The logical structure of the file may be of a movie or video clip (potentially including both video and audio data) that in turn contains a set of time-parallel tracks. The time structure of the file may be that the tracks contain sequences of samples in time, and those sequences are mapped into the timeline of the overall movie by optional edit lists. The physical structure of the file may separate the data needed for logical, time, and structural de-composition, from the media data samples themselves. This structural information may be concentrated in a movie box, possibly extended in time by movie fragment boxes. The movie box may document the logical and timing relationships of the samples, and may also contain pointers to where they are located. Those pointers may be into the same file or another one, e.g., referenced by a URL.

Each media stream may be contained in a track specialized for that media type (audio, video etc.), and may further be parameterized by a sample entry. The sample entry may contain the 'name' of the exact media type (the type of decoder needed to decode the stream) and any parameterization of that decoder needed. The name may also take the form of a four-character code, e.g., "moov," or "trak." There are defined sample entry formats not only for MPEG-4 media, but also for the media types used by other organizations using this file format family.

Support for meta-data generally takes two forms. First, timed meta-data may be stored in an appropriate track, and synchronized as desired with the media data it is describing. Secondly, there may be general support for non-timed meta-data attached to the movie or to an individual track. The structural support is general, and allows the storage of meta-data resources elsewhere in the file or in another file, in a manner similar to the storage of the media data, that is, the coded video pictures. In addition, these resources may be named, and may be protected.

In the ISO base media file format, a sample grouping is an assignment of each of the samples in a track to be a member of one sample group. Samples in a sample group are not required to be contiguous. For example, when presenting H.264/AVC in AVC file format, video samples in one temporal level can be sampled into one sample group. Sample groups may be represented by two data structures: a SampleToGroup box (sbdp) and a SampleGroupDescription box. The SampleToGroup box represents the assignment of samples to sample groups. There may be one instance of the SampleGroupDescription box for each sample group entry, to describe the properties of the corresponding group.

An optional metadata track can be used to tag each track with the "interesting characteristic" that it has, for which its value may differ from other members of the group (e.g., its bit rate, screen size, or language). Some samples within a track may have special characteristics or may be individually identified. One example of the characteristic is the synchronization point (often a video I-frame). These points may be identified by a special table in each track. More generally, the nature of dependencies between track samples can also be documented using metadata. The metadata can be structured as a sequence of file format samples, just like a video track. Such a track may be referred to as a metadata track. Each metadata sample may be structured as a metadata statement. There are various kinds of statements, corresponding to the various questions that might be asked about the corresponding file-format sample or its constituent samples.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers. Special tracks called hint tracks may be placed in the files.

Hint tracks contain general instructions for streaming servers as to how to form packet streams from media tracks for a specific protocol. Because the form of these instructions is media-independent, servers may not need to be revised when new codecs are introduced. In addition, encoding and editing software can be unaware of streaming servers. Once editing is finished on a file, a piece of software called a hinter may be used to add hint tracks to the file, before placing it on a streaming server. As an example, there is a defined hint track format for RTP streams in the MPEG-4 file format specification.

The term "progressive download" is used to describe the transfer of digital media files from a server to a client, typically using the HTTP protocol. When initiated from a computer, the computer may begin playback of the media before the download is complete. One difference between streaming media and progressive download is in how the digital media data is received and stored by the end user device that is accessing the digital media. A media player that is capable of progressive download playback relies on metadata located in the header of the file to be intact and a local buffer of the digital media file as it is downloaded from a web server. At the point at which a specified amount of buffered data becomes available to the local playback device, the device may begin to play the media. This specified amount of buffered data may be embedded into the file by the producer of the content in the encoder settings and may be reinforced by additional buffer settings imposed by the media player of the client computer.

AVC and 3GPP are extensions of the ISO base media file format, while SVC and MVC are extensions of the AVC file format. Accordingly, the techniques of this disclosure may be applied with respect to video files conforming to the ISO base media file format, the AVC file format and extensions thereof, e.g., SVC and MVC, and/or the Third Generation Partnership Project (3GPP) file format. The techniques may further be applied to these and other extensions of these formats, and may further be applied to extend other file formats to provide SEI messages separately from the video data the SEI messages describe. Thus, although generally described with respect to AVC for purposes of example, it should be understood that the techniques of this disclosure may be generally applied to any other file format.

The Motion Pictures Experts Group (MPEG) has developed an AVC file format, as an extension of the ISO base media file format. In the AVC file format, parameter sets, including the sequence parameter set and the picture parameter sets can be associated with the video elementary stream, which is the in the video track. It is also possible to have the parameter sets in another track, called a parameter set track, which includes the parameter set elementary stream containing the samples that are the SPS or PPS network abstraction layer (NAL) units. The location of SEI message NAL units, however, is not restricted in the AVC file format, as long as any SEI message is presented in a sample with a decoding time prior to any picture that uses this SEI message.

AVC file format has the SVC and MVC extensions, to support the storage of SVC and MVC, respectively. In SVC and MVC, multiple layers/views can be contained in one video track or multiple video tracks. There are tools defined in the SVC and MVC specifications to construct operation points when the layers/views are presented in various organizations.

Some functionalities of SVC are inherited from H.264/AVC. Compared with previous scalable standards, the SVC standard may provide various advantages such as, for example, hierarchical temporal scalability, inter-layer prediction, single-loop decoding, and flexible transport interface. H.264/AVC provides a flexible, hierarchical B-picture coding structure that enables advanced temporal scalability. With this feature inherited from H.264/AVC, SVC supports temporal scalability for layers with different resolutions. In SVC, a Group of Pictures (GOP) includes a so-called key picture, and all pictures which are located in the output/display order between this key picture and the previous key picture. A key picture may be coded in regular or irregular intervals, and may be either intra-coded or inter-coded using the previous key picture as a reference for motion compensated prediction. The non-key pictures may be hierarchically predicted from pictures with lower temporal levels, and the key picture may have the lowest temporal level. The temporal level of a picture may be indicated by the syntax element temporal_id in the NAL unit header SVC extension.

SVC introduces inter-layer prediction for spatial and signal-to-nose ratio (SNR) scalabilities based on texture, residue and motion. The spatial scalability in SVC can be generalized to any resolution ratio between two layers. The SNR scalability can be realized by Coarse Granularity Scalability (CGS), Medium Granularity Scalability (MGS), or Fine Grain Scalability (FGS). In SVC, two spatial or CGS layers may belong to different dependency layers (as may be indicated by dependency_id in NAL unit header), while two MGS layers can be in the same dependency layer. One dependency layer may include quality layers with quality_id from 0 to higher values, corresponding to quality enhancement layers. SVC provides inter-layer prediction methods that may be utilized to reduce the inter-layer redundancy. They are summarized as inter-layer texture prediction, inter-layer residual prediction, and inter-layer motion prediction.

SVC also provides flexible systems and transport interface designs that may enable seamless integration of the codec to scalable multimedia application systems. Other than compression and scalability provisioning, systems and transport interface focus on codec functionalities, such as, for video codec in general, interoperability and conformance, extensibility, random access, timing, buffer management, as well as error resilience, and for scalable coding in particular, backward compatibility, scalability information provisioning, and scalability adaptation.

SVC further provides a single-loop decoding scheme. In the single-loop decoding scheme, only the target layer needs to be motion compensated and fully decoded. Therefore, compared with other multiple-loop decoding schemes, where motion compensation and full decoding are typically performed for every spatial or SNR scalable layer, the single-loop decoding scheme of SVC can greatly reduce decoding complexity as well as the DPB size.

SVC and MVC have similar high level syntax designs, e.g., in the NAL unit header, sequence parameter set and SEI messages. In both SVC and MVC, extraction of the entire bitstream is supported to a certain extent for the adaptation of bandwidth or device capability. The extracted sub-bitstreams correspond to different operation points.

In some examples, the techniques of this disclosure may be applied to H.264/AVC codecs or codecs based on AVC, such as SVC, MVC, or other extensions of H.264/AVC. Such codecs may be configured to recognize SEI messages when the SEI messages are associated within one coded picture, e.g., an access unit, where the SEI message may be encapsulated within the access unit in an ISO base media file format or MPEG-2 Systems bitstream. The techniques also deal with future coding standards, e.g., H.265/HEVC, to allow SEI messages to be conveyed separately from any access unit described by the SEI messages.

With respect to 3GPP as another example, HTTP/TCP/IP transport is supported for 3GP files for download and progressive download. Furthermore, using HTTP for video streaming may provide some advantages, and the video streaming services based on HTTP are becoming popular. HTTP streaming may provide certain advantages, including that existing Internet components and protocols may be used, such that new efforts are not needed to develop new techniques for transporting video data over a network. Other transport protocols, e.g., RTP payload format, require intermediate network devices, e.g., middle boxes, to be aware of the media format and the signaling context. Also, HTTP streaming can be client-driven, which may avoid control issues.

For example, to exploit features to obtain optimal performance, the server may keep track of the size and content of packets which are not yet acknowledged. The server may also analyze the file structure and reconstruct the state of the client buffer to make RD-optimal switching/thinning decisions. In addition, constraints on the bit stream variations may be satisfied in order to stay compliant with negotiated profiles. HTTP does not necessarily require new hardware or software implementations at a Web server that has HTTP 1.1 implemented. HTTP streaming also provides TCP-friendliness and firewall traversal.

In HTTP streaming, frequently used operations include GET and partial GET. The GET operation retrieves a whole file associated a given uniform resource locator (URL) or uniform resource name (URN). The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media presentation may be a structured collection of data that is accessible to the client. The client may request and download media data information to present a streaming service to a user.

FIG. 1 is a block diagram illustrating an example system 10 in which audio/video (A/V) source device 20 transports audio and video data to A/V destination device 40. System 10 of FIG. 1 may correspond to a video teleconference system, a server/client system, a broadcaster/receiver system, or any other system in which video data is sent from a source device, such as A/V source device 20, to a destination device, such as A/V destination device 40. In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the transport of encoded multimedia (e.g., audio and video) data, and reception and subsequent interpretation and decoding of the transported multimedia data. As shown in the example of FIG. 1, video source 24 may provide a plurality of views of a scene to video encoder 28.

A/V source device 20 may provide a "service" to A/V destination device 40. A service generally corresponds to a subset of available views of MVC data. For example, MVC data may be available for eight views, ordered zero through seven. One service may correspond to stereo video having two views, while another service may correspond to four views, and still another service may correspond to all eight views. In general, a service corresponds to any combination (that is, any subset) of the available views. A service may also correspond to a combination of available views as well as audio data. An operation point may correspond to a service, such that A/V source device 20 may further provide an operation point descriptor for each service provided by A/V source device 20.

Each individual stream of data (whether audio or video) is referred to as an elementary stream. An elementary stream is a single, digitally coded (possibly compressed) component of a program. For example, the coded video or audio part of the program can be an elementary stream. An elementary stream may be converted into a packetized elementary stream (PES) before being encapsulated within a video file. Within the same program, a stream ID is used to distinguish the PES-packets belonging to one elementary stream from the other. The basic unit of data of an elementary stream is a packetized elementary stream (PES) packet. Thus, each view of MVC video data corresponds to respective elementary streams. Similarly, audio data corresponds to one or more respective elementary streams. A sequence data set, which may include, e.g., a sequence parameter set, a picture parameter set, and sequence level SEI messages, may be included in a parameter set track or a parameter set elementary stream, in accordance with the techniques of this disclosure. The techniques of this disclosure may be applied to video files or video streams conforming to MPEG-2 Systems, including Packetized Elementary Stream (PES), Program Stream (PS), and Transport Stream (TS), and their AVC, SVC, and MVC extensions.

An MVC coded video sequence may be separated into several sub-bitstreams, each of which is an elementary stream. Each sub-bitstream may be identified using an MVC view_id subset. Based on the concept of each MVC view_id subset, an MVC video sub-bitstream is defined. An MVC video sub-bitstream contains the NAL units of the views listed in the MVC view_id subset. A program stream generally contains only the NAL units which are from those of the elementary streams. It is also designed that any two elementary streams cannot contain an identical view.

In the example of FIG. 1, encapsulation unit 30 receives elementary streams comprising video data from video encoder 28 and elementary streams comprising audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

A "program," as used in this disclosure, may comprise a combination of audio data and video data, e.g., an audio elementary stream and a subset of available views delivered by a service of A/V source device 20. Each PES packet includes a stream_id that identifies the elementary stream to which the PES packet belongs. Encapsulation unit 30 is responsible for assembling elementary streams into a video file.

Encapsulation unit 30 receives PES packets for elementary streams of a program from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

In accordance with the techniques of this disclosure, encapsulation unit 30 may arrange data of a video file such that sequence level SEI messages are decoupled from coded video pictures described by the sequence level SEI messages. In this manner, encapsulation unit 30 may decouple sequence level SEI messages from specific access units containing coded video data. For example, encapsulation unit 30 may include sequence level SEI messages in a parameter set elementary stream, along with SPS and PPS data, e.g., for video data encoded according to AVC or extensions thereof, such as MVC and SVC. In addition, for examples in which video data is encoded according to MVC and/or SVC, encapsulation unit 30 may include subset SPSs in the parameter set elementary stream.

In some examples, encapsulation unit 30 may be configured to place only certain SEI messages into a parameter set elementary stream. For example, for H.264/AVC, encapsulation unit 30 may include SEI messages that describe pan-scan rectangle and stereo video information in the parameter set elementary stream. As another example, for SVC, encapsulation unit 30 may include SEI messages that describe scalability information in the parameter set elementary stream. As yet another example, for MVC, encapsulation unit 30 may include SEI messages that describe view scalability information, multiview acquisition information, and multiview scene information.

In general, SPSs and PPSs (and subset SPSs, e.g., for MVC and SVC), along with sequence level SEI messages, may be collectively referred to as a "sequence data set." As discussed above, the sequence data set may be included in a separate track, such as the parameter set elementary stream. In some examples, rather than placing the sequence data set in a separate parameter track, encapsulation unit 30 may present the sequence data set for a sequence continuously in a file, such that destination device 40 can retrieve the entire sequence data set using an HTTP partial GET request. For example, the sequence data set may be contained in a specialized video sample, which does not contain coded video data, e.g., portions of or entire coded video pictures.

By separating the sequence data set from the video data described by the sequence data set, destination device 40 may retrieve the sequence data set separately of the video data described by the sequence data set. In this manner, source device 20 may transmit the sequence data set to destination device 40 prior to transmitting video data described by the sequence data set to destination device 40. Thus, source device 20 may send the sequence data set to destination device 40 before a movie fragment that contains a coded video picture is sent to destination device 40.

In some examples, e.g., with respect to the use of 3GPP video files, the sequence data set can be included in a separate 3GPP file, which may be sent to destination device 40 after destination device 40 accesses a media presentation descriptor. That is, destination device 40 may retrieve the media presentation descriptor for a sequence of video data, then retrieve a 3GPP file including the sequence data set for the sequence of video data, and then retrieve the sequence of video data itself. In some examples, the sequence data set may form part of the media presentation descriptor itself. In some examples, the sequence data set may be included in part of a movie box that does not contain coded video data. In some examples, the sequence data set may form a movie fragment that is placed after the movie box.

Encapsulation unit 30 may form NAL units comprising a header that identifies a program to which the NAL belongs, as well as a payload, e.g., audio data, video data, or data that describes the transport or program stream to which the NAL unit corresponds. For example, in H.264/AVC, a NAL unit includes a 1-byte header and a payload of varying size. In one example, a NAL unit header comprises a priority_id element, a temporal_id element, an anchor_pic_flag element, a view_id element, a non_idr_flag element, and an inter_view_flag element. In conventional MVC, the NAL unit defined by H.264 is retained, except for prefix NAL units and MVC coded slice NAL units, which include a 4-byte MVC NAL unit header and the NAL unit payload.

The priority_id element of a NAL header may be used for a simple one-path bitstream adaptation process. The temporal_id element may be used for specifying the temporal level of the corresponding NAL unit, where different temporal levels correspond to different frame rates.

The anchor_pic_flag element may indicate whether a picture is an anchor picture or non-anchor picture. Anchor pictures and all the pictures succeeding it in the output order (that is, the display order) can be correctly decoded without decoding of previous pictures in the decoding order (that is, the bitstream order), and thus, can be used as random access points. Anchor pictures and non-anchor pictures can have different dependencies, both of which are signaled in the sequence parameter set. Other flags are to be discussed and used in the following sections of this chapter. Such an anchor picture may also be referred to as an open GOP (Group Of Pictures) access point, while a close GOP access point is also supported when the non_idr_flag element is equal to zero. The non_idr_flag element indicates whether a picture is an instantaneous decoder refresh (IDR) or view IDR (V-IDR) picture. In general, an IDR picture, and all the pictures succeeding it in output order or bitstream order, can be correctly decoded without decoding of previous pictures in either decoding order or display order.

The view_id element may comprise syntax information that may be used to identify a view, which may be used for data interactivity inside an MVC decoder, e.g., for inter-view prediction, and outside a decoder, e.g., for rendering. The inter_view_flag element may specify whether the corresponding NAL unit is used by other views for inter-view prediction. To convey the 4-byte NAL unit header information for a base view, which may be compliant to AVC, a prefix NAL unit is defined in MVC. In the context of MVC, the base view access unit includes the VCL NAL units of the current time instance of the view as well as its prefix NAL unit, which contains only the NAL unit head. An H.264/AVC decoder may ignore the prefix NAL unit.

A NAL unit including video data in its payload may comprise various granularity levels of video data. For example, a NAL unit may comprise a block of video data, a macroblock, a plurality of macroblocks, a slice of video data, or an entire frame of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 second. During this time interval, the specific frames for all views of the same access unit (the same time instance) may be rendered simultaneously. In an example corresponding to H.264/AVC, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

As with most video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

The examples of SVC and MVC provide sequence parameter set (SPS) extensions for scalable video or multiview video. The SPS extension information may be contained in sub-SPS NAL units, which may have a different NAL unit type than the other NAL units. Profile and level information for the supported operation points may be included in NAL units including SPS extension information.

A media presentation may include a media presentation description (MPD), which may contain descriptions of different alternative representations (e.g., video services with different qualities) and the description may include, e.g., codec information, a profile value, and a level value. Destination device 40 may retrieve the MPD of a media presentation to determine how to access movie fragments of various presentations. Movie fragments may be located in movie fragment boxes (moof boxes) of video files.

Video compression standards such as ITU-T H.261, H.262, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures use only the reference picture before the current picture in temporal order. In a B-picture, each block of the B-picture may be predicted from one or two reference pictures. These reference pictures could be located before or after the current picture in temporal order.

In accordance with the H.264 coding standard, as an example, B-pictures use two lists of previously-coded reference pictures, list 0 and list 1. These two lists can each contain past and/or future coded pictures in temporal order. Blocks in a B-picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination will be used to predict the current block.

The ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "x" and "by" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra-(I), or inter-(P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, encapsulation unit 30, and decapsulation unit 38 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, and/or decapsulation unit 38 may comprise an integrated circuit, a microprocessor, and/or a wireless communication device, such as a cellular telephone.

After encapsulation unit 30 has assembled NAL units and/or an access units into a video file based on received data, encapsulation unit 30 passes the video file to output interface 32 for output. In some examples, encapsulation unit 30 may store the video file locally or send the video file to a remote server via output interface 32, rather than sending the video file directly to destination device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Ultimately, input interface 36 retrieves the data from computer-readable medium 34. Input interface 36 may comprise, for example, an optical drive, a magnetic media drive, a USB port, a receiver, a transceiver, or other computer-readable medium interface. Input interface 36 may provide the NAL unit or access unit to decapsulation unit 38. Decapsulation unit 38 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In addition, decapsulation unit 38 may send a decoded sequence data set, which may include PPS data, SPS data, and/or sequence level SEI messages, to video output 44. Video output 44 may comprise a display that uses a single view of a scene or a plurality of views of a scene, e.g., a stereoscopic or autostereoscopic display that presents each view of a scene simultaneously or in rapidly alternating succession. Video output 44 may use the sequence data set to display the decoded video pictures. The sequence level SEI messages may also be used to assist in the decoding process, although SEI messages are not required to properly decode samples of a video sequence. Accordingly, video decoder 48 may also use the sequence level SEI messages when decoding video samples of the video file.

As noted above, SEI messages may be used for a variety of purposes. For example, the sequence level SEI messages may describe pan-and-scan information for adjusting video data to accommodate various screen sizes when displayed. Accordingly, video output 44 (or a control unit thereof) may use the sequence level SEI messages to adjust the video data to be displayed by video output 44.

As another example, the sequence level SEI messages may describe stereo video information. That is, the sequence level SEI messages may describe which pictures are "left" or "right" images for three-dimensional video applications. Accordingly, video output 44 may use the sequence level SEI messages to determine how to present three-dimensional video data. For example, video output 44 may display left and right images using different polarizations of light or with different color filters (e.g., red and green), or may rapidly alternate between left and right images, such that active glasses associated with video output 44 may alternate between which lens allows light to pass.

As yet another example, the sequence level SEI messages may provide scalability information, e.g., for examples in which the video file is constructed according to SVC or MVC.

Accordingly, video decoder 48 may use the sequence level SEI messages to determine whether enhancement-layer information has been received, and accordingly whether to use received enhancement-layer data or to interpolate values to upsample base layer video data.

As another example, the sequence level SEI messages may provide multiview acquisition information or multiview scene information, e.g., for examples in which the video file is constructed according to MVC. In general, multiview acquisition information SEI messages specify parameters of an acquisition environment, such as, for example, intrinsic and extrinsic camera parameters, a number of views, a focal length, a principal point, a skew factor, rotation parameters, and/or translation parameters. Multiview scene information SEI messages may specify the maximum disparity among multiple views, when the views are captured. This information may be used by video decoder 48 and/or video output 44 when decoding and/or rendering three-dimensional video data, e.g., when constructing an additional image from an existing image. Multiview scene information may also describe characteristics of one or more cameras or conditions during image acquisition, such as, for example, what is the maximum disparity caused by camera settings of, e.g., up to 1024 views. The multiview scene information may also provide details relevant to camera calibration and rectification.

Figure 2:
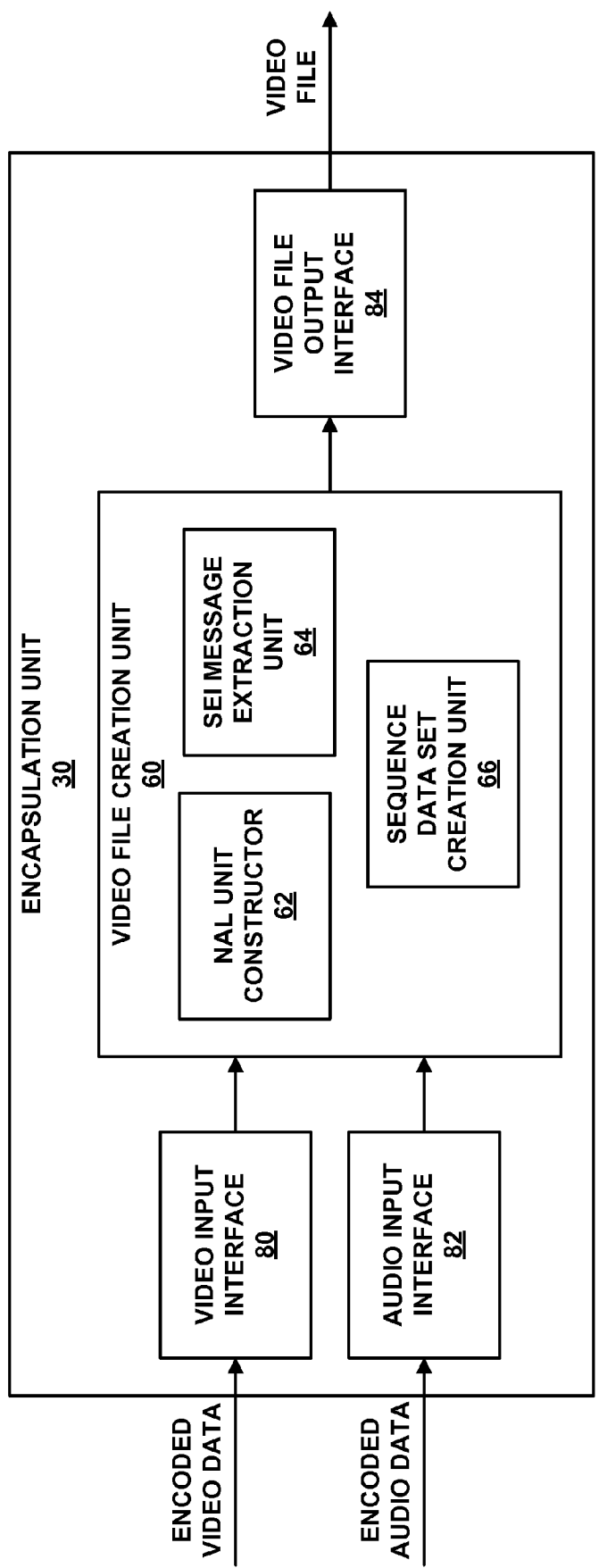
FIG. 2 is a block diagram illustrating components of an example encapsulation unit.

FIG. 2 is a block diagram illustrating components of an example encapsulation unit 30. In the example of FIG. 2, encapsulation unit 30 includes video input interface 80, audio input interface 82, video file creation unit 60, and video file output interface 84. Video file creation unit 60, in this example, includes network abstraction layer (NAL) unit constructor 62, SEI message extraction unit 64, and sequence data set creation unit 66.

Video input interface 80 and audio input interface 82 receive encoded video and audio data, respectively. Video input interface 80 and audio input interface 82 may receive encoded video and audio data as the data is encoded, or may retrieve encoded video and audio data from a computer-readable medium. Upon receiving encoded video and audio data, video input interface 80 and audio input interface 82 pass the encoded video and audio data to video file creation unit 60 for assembly into a video file.

Video file creation unit 60 may correspond to a control unit including hardware, software, and/or firmware configured to perform the functions and procedures attributed thereto. The control unit may further perform the functions attributed to encapsulation unit 30 generally. For examples in which video file creation unit 60 is embodied in software and/or firmware, encapsulation unit 30 may include a computer-readable medium comprising instructions for video file creation unit 60 and a processing unit to execute the instructions. Each of the sub-units of video file creation unit 60 (NAL unit constructor 62, SEI message extraction unit 64, and sequence data set creation unit 66, in this example) may be implemented as individual hardware units and/or software modules, and may be functionally integrated or further separated into additional sub-units. Video file creation unit 60 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation unit 60 may further include a non-transitory computer-readable medium storing instructions for any or all of NAL unit constructor 62, SEI message extraction unit 64, and sequence data set creation unit 66, as well as a processor for executing the instructions.

In general, video file creation unit 60 may create a video file including the received audio and video data. NAL unit constructor 62 may form NAL units including encoded video and audio samples. Video file creation unit 60 may further be configured to assemble access units including all NAL units for a particular time instance. Furthermore, video file creation unit 60 may be configured to decouple sequence level SEI messages from encoded video pictures described by the sequence level SEI messages, and store the sequence level SEI messages in the created video file separately from the encoded video pictures described by the sequence level SEI messages.

Video encoder 28 (FIG. 1) may include SEI messages with samples of video data. SEI messages received from video encoder 28 for a number of individual samples may be the same for each of the samples, in some cases. Accordingly, rather than transmitting the same SEI messages for each of the samples, upon determining that the SEI messages for the individual samples are the same (or very similar) for each of the samples, SEI message extraction unit 64 may separate the SEI messages from the samples described by the SEI messages. Such SEI messages that may relate to more than one encoded video picture may be referred to as sequence level SEI messages.

Additionally or alternatively, video file creation unit 60 may be configured to generate sequence level SEI messages for a sequence of coded video pictures. In this manner, video file creation unit 60 may generate sequence level SEI messages or separate existing SEI messages from video samples to form sequence level SEI messages that describe one or more of the video samples.

Sequence data set creation unit 66 may create a sequence data set for a video file produced by video file creation unit 60. Sequence data set creation unit 66 may group sequence level SEI messages with sequence parameter set and/or picture parameter set data. For example, sequence data set creation unit 66 may include the sequence level SEI messages in a parameter set elementary stream that includes the SPSs and PPSs, and in some examples (e.g., with respect to SVC and MVC), subset SPSs. As another example, sequence data set creation unit 66 may include the sequence level SEI messages for a sequence of coded video pictures in a continuous section of the created video file. That is, sequence data set creation unit 66 may ensure that data for sequence level SEI messages for a particular sequence of coded video pictures are grouped together in a continuous series of one or more bytes. For example, sequence data set creation unit 66 may assemble the sequence level SEI messages and other data for the sequence data set into a particular video sample that does not contain any part of a coded video picture.

As another example, e.g., with respect to 3GPP, sequence data set creation unit 66 may assemble the sequence data set for a sequence of coded video pictures into a relatively small 3GPP file that precedes one or more 3GPP files including the sequence of coded video pictures described by the sequence data set. Alternatively, sequence data set creation unit 66 may include the sequence data set in a media presentation description (MPD) file for one or more related presentations including one or more 3GPP files.

As yet another example, sequence data set creation unit 66 may include the sequence data set within a movie box (moov box) of a video file when the movie box does not include coded video pictures. As another example, sequence data set creation unit 66 may include the sequence data set within a movie fragment box (moof box) that occurs after the movie box (moov box) of a video file, but before any movie fragment boxes that include coded video pictures.

By grouping SPSs, PPSs, sequence level SEI messages, and/or subset SPSs into a sequence data set, sequence data set creation unit 66 may simplify the task of providing sequence data to a client device, such as destination device 40. In this manner, the sequence level SEI messages may be transmitted to destination device 40 before coded video pictures described by the sequence level SEI messages are transmitted to destination device 40.

In general, SPSs, PPSs, and sequence level SEI messages of a sequence data set are expected to remain constant for a sequence of video samples described by the sequence data set. However, in some cases, certain portions of the SPSs, PPSs, and/or the sequence level SEI messages may vary slightly for individual coded video pictures or for sets or sub-sequences of coded video pictures. For example, in a video file that encapsulates a number of coded video pictures, there may be one or more sequences that do not necessary share the same information of an SPS, a PPS, or sequence level SEI messages.

When this occurs, sequence data set creation unit 66 may create multiple parameter set tracks, where each track may include a set of SPSs, PPS, and/or SEI messages, as well as indications of timing information indicating when the sequence data set of the track applies. For example, the timing information may indicate a start time for the video sequence that indicates a time at which the track begins to apply to the video sequence and/or an end time for the video sequence at which the track including the timing information no longer applies. Alternatively, the timing information for each track may indicate only an end time, such that upon reaching the end time for a particular parameter set track, a client device may jump to a next parameter set track. Such timing information may correspond to a coordinated universal time (UTC) or a duration of a last video sample (for the end time) to which the parameter set track applies in a timescale that is used for the whole video in the file encapsulation format.

One of the multiple parameter set tracks may apply to all samples of the video file. Sequence data set creation unit 66 may indicate a parameter set track that applies to all samples of a video file by setting the timing information for the parameter set track to a UTC time later than any movie sample or movie fragment. Alternatively, sequence data set creation unit 66 may indicate a duration of zero for the timing information for a parameter set track that applies to all samples of a video file.

For examples in which sequence data set creation unit 66 creates multiple parameter set tracks, sequence data set creation unit 66 may assign each of the parameter set tracks respective unique identifiers. When a client device, such as destination device 40, requests to seek to a particular temporal location, e.g., by local playback or during HTTP streaming, destination device 40 may determine which one of a number of parameter set tracks applies to the seeked-to temporal location. The client device may request identifiers for parameter set tracks having timing information indicating that the respective parameter set tracks apply to video samples later than the seeked-to temporal location. A server (e.g., source device 20) may maintain a data structure to mark such relevant parameter set tracks to ensure that the relevant parameter set tracks are delivered to the client, e.g., in the context of HTTP streaming. During local playback, the client may maintain a similar data structure to ensure that the relevant parameter set tracks are parsed by the client device.

Moreover, rather than including a number of parameter set tracks, sequence data set creation unit 66 may include a number of sequence data sets in a video file, each of which may be stored continuously within the file. That is, each of the sequence data sets may be stored continuously such that all data for a particular one of the sequence data sets is continuous, but the sequence data sets need not be stored continuously with each other. For example, sequence data set creation unit 66 may store a sequence data set in a video fragment preceding a series of fragments to which the sequence data set is relevant, and then store a new sequence data set after the series of fragments. The new sequence data set may be relevant to other video fragments, following the fragment storing the new sequence data set. When storing multiple sequence data sets in a file, sequence data set creation unit 66 may provide timing information for each of the sequence data sets, as well as a unique identifier for each of the sequence data sets.

After video file creation unit 60 produces a video file including sequence level SEI messages that are separated from coded video pictures described by the sequence level SEI messages, video file creation unit 60 may pass the video file to video file output interface 84. Video file output interface 84 may output the video file, e.g., to output interface 32 of source device 20. In some examples, video file output interface 84 may output the video file to a storage medium of source device 20 (not shown). The video file may be stored locally within source device 20, stored to a portable storage medium such as a DVD, Blu-ray disc, flash drive, floppy disk, or other portable storage medium, output via a network, e.g., according to a streaming protocol such as HTTP streaming, or otherwise output in such a way that the video file may be received by a client device, such as destination device 40. In this manner, outputting of video data, e.g., sequence level SEI messages and coded video pictures described by the sequence level SEI messages, may include storing, transferring, transmitting, and broadcasting of the video data.

Figure 3:
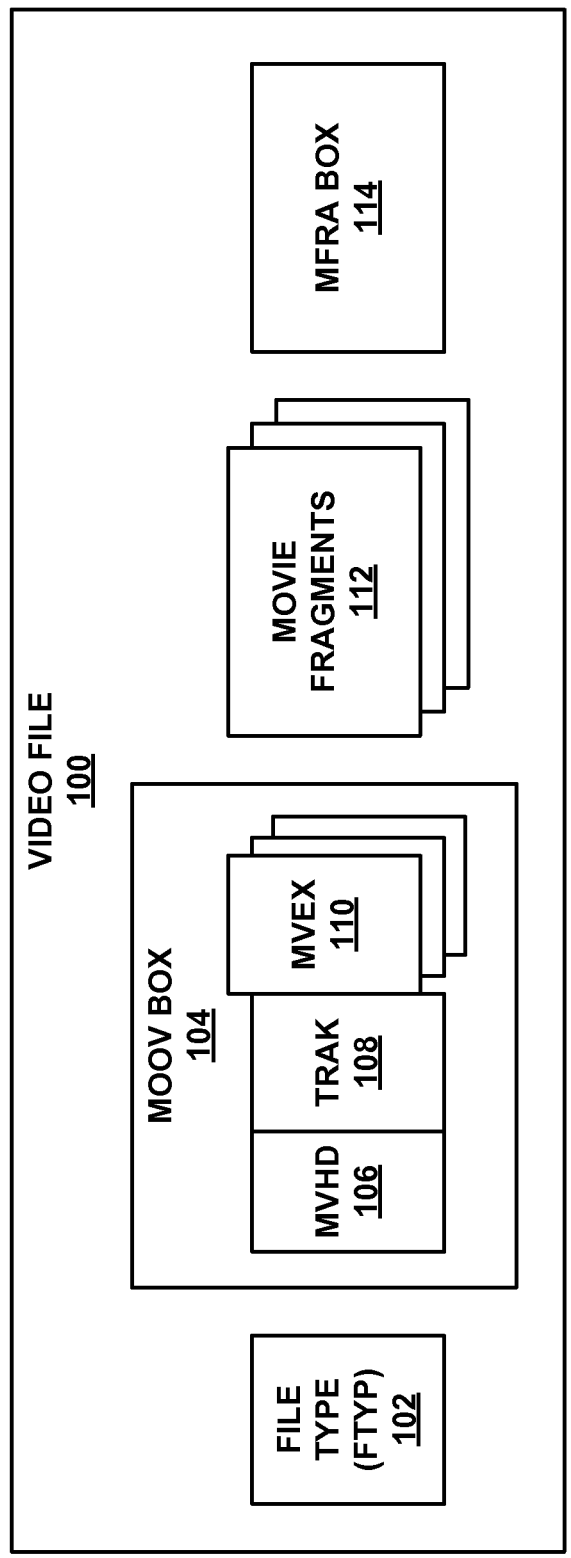
FIG. 3 is a block diagram illustrating elements of an example video file that may include sequence level SEI messages in various locations.

FIG. 3 is a block diagram illustrating elements of an example video file 100 that may include sequence level SEI messages in various locations. As described above, video files in accordance with the ISO base media file format and extensions thereof store data in a series of objects, referred to as "boxes." In the example of FIG. 3, video file 100 includes file type (FTYP) box 102, movie (MOOV) box 104, movie fragment (MOOF) boxes 112, and movie fragment random access (MFRA) box 114.

File type box 102 generally describes a file type for video file 100. File type box 102 may include data that identifies a specification that describes a best use for video file 100. File type box 102 may be placed before MOOV box 104, movie fragment boxes 112, and MFRA box 114.

MOOV box 104, in the example of FIG. 3, includes movie header (MVHD) box 106, track (TRAK) box 108, and one or more movie extends (MVEX) boxes 110. In general, MVHD box 106 may describe general characteristics of video file 100. For example, MVHD box 106 may include data that describes when video file 100 was originally created, when video file 100 was last modified, a timescale for video file 100, a duration of playback for video file 100, or other data that generally describes video file 100.

TRAK box 108 may include data for a track of video file 100. TRAK box 108 may include a track header (TKHD) box that describes characteristics of the track corresponding to TRAK box 108. In some examples, TRAK box 108 may include coded video pictures, while in other examples, the coded video pictures of the track may be included in movie fragments 112, which may be referenced by data of TRAK box 108.

In some examples, video file 100 may include more than one track. Accordingly, MOOV box 104 may include a number of TRAK boxes equal to the number of tracks in video file 100. TRAK box 108 may describe characteristics of a corresponding track of video file 100. For example, TRAK box 108 may describe temporal and/or spatial information for the corresponding track. A TRAK box similar to TRAK box 108 of MOOV box 104 may describe characteristics of a parameter set track, when encapsulation unit 30 (FIG. 1) includes a parameter set track in a video file, such as video file 100. Encapsulation unit 30 may signal the presence of sequence level SEI messages in the parameter set track within the TRAK box describing the parameter set track.

MVEX boxes 110 may describe characteristics of corresponding movie fragments 112, e.g., to signal that video file 100 includes movie fragments 112, in addition to video data included within MOOV box 104, if any. In the context of streaming video data, coded video pictures may be included in movie fragments 112 rather than in MOOV box 104. Accordingly, all coded video pictures may be included in movie fragments 112, rather than in MOOV box 104.

MOOV box 104 may include a number of MVEX boxes 110 equal to the number of movie fragments 112 in video file 100. Each of MVEX boxes 110 may describe characteristics of a corresponding one of movie fragments 112. For example, each MVEX box may include a movie extends header box (MEHD) box that describes a temporal duration for the corresponding one of movie fragments 112.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 112. Encapsulation unit 30 may further signal the presence of a sequence data set and/or sequence level SEI messages as being present in one of movie fragments 112 within the one of MVEX boxes 110 corresponding to the one of movie fragments 112.

Movie fragments 112 may include one or more coded video pictures. In some examples, movie fragments 112 may include one or more groups of pictures (GOPs), each of which may include a number of coded video pictures, e.g., frames or pictures. In addition, as described above, movie fragments 112 may include sequence data sets in some examples. Each of movie fragments 112 may include a movie fragment header box (MFHD). The MVHD box may describe characteristics of the corresponding movie fragment, such as a sequence number for the movie fragment. Movie fragments 112 may be included in order of sequence number in video file 100.

MFRA box 114 may describe random access points within movie fragments 112 of video file 100. This may assist with performing seeks to particular temporal locations within video file 100. MFRA box 114 is generally optional and need not be included in video files of some examples. Likewise, a client device, such as destination device 40, does not necessarily need to reference MFRA box 114 to correctly decode and display video data of video file 100. MFRA box 114 may include a number of track fragment random access (TFRA) boxes equal to the number of tracks of video file 100, or in some examples, equal to the number of media tracks (e.g., non-hint tracks) of video file 100.

Figure 4:
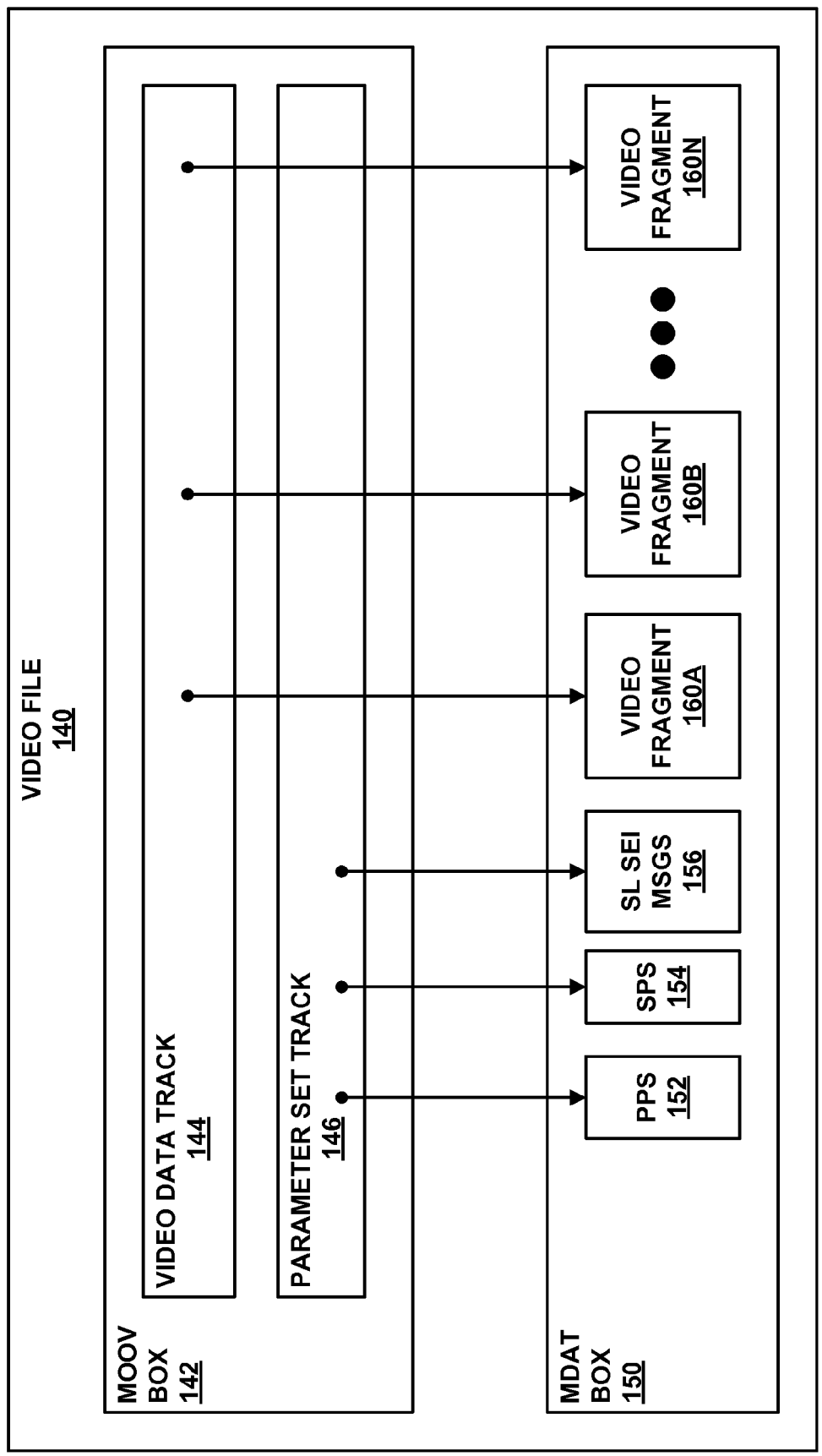
FIG. 4 is a block diagram illustrating elements of another example video file, which includes a parameter set track that contains sequence level SEI messages.

FIG. 4 is a block diagram illustrating elements of another example video file 140, which includes a parameter set track 146 that contains sequence level SEI messages 156. In particular, video file 140 includes MOOV box 142 and MDAT box 150. Video file 140 may further include other boxes, such as a file type box and/or an MFRA box, among others.

In the example of FIG. 4, MOOV box 142 includes video data track 144 and parameter set track 146. Parameter set track 146 corresponds to picture parameter set (PPS) 152, sequence parameter set (SPS) 154, and sequence level supplemental enhancement information (SL SEI) messages 156. Video data track 144 corresponds to video fragments 160A-160N (video fragments 160). In general, video fragments 160 may each include one or more coded video pictures.

In the example of FIG. 4, data for PPS 152, SPS 154, sequence level SEI messages 156, and video fragments 160 are stored in MDAT box 150. PPS 152, SPS 154, and sequence level SEI messages 156 may collectively be referred to as a sequence parameter set. In some examples, parameter set track 146 may include more than one picture parameter set. PPS 152, SPS 154, and sequence level SEI messages 156 generally describe characteristics of video fragments 160. These characteristics may assist a client device, such as destination device 40, in selecting, decoding, and/or rendering video fragments 160.

As an example, when video file 140 corresponds to AVC file format, sequence level SEI messages 156 may include one or more of pan-scan rectangle SEI messages, stereo video information SEI messages, and/or frame packing arrangement SEI messages. As another example, when video file 140 corresponds to an SVC file format, sequence level SEI messages 156 may include scalability information SEI messages. As another example, when video file 140 corresponds to an MVC file format, sequence level SEI messages 156 may include one or more of view scalability information SEI messages, multiview acquisition information SEI messages, and/or multiview scene information SEI messages.

A video file may include a number of media tracks similar to video data track 144. Each of the video data tracks may have different characteristics, which may correspond to various decoding and/or rendering requirements. Destination device 40 may select one of the media tracks based on, among other things, the characteristics of the video fragments for the media track signaled by the sequence data set. For example, destination device 40 may select one of the tracks based on decoding and/or rendering capabilities of video decoder 48 and video output 44, respectively. Destination device 40 may determine the characteristics of video fragments 160 based on parameter set track 146, including PPS 152, SPS 154, and sequence level SEI messages 156.

Destination device 40 may be configured to retrieve the sequence parameter set, e.g., MOOV box 104, the one of movie fragments 112 that includes the sequence parameter set, the video sample that includes the sequence parameter set but no coded video data, or other element of video file 100 before any coded sample described by the sequence parameter set. Additionally or alternatively, source device 20 may be configured to provide the sequence parameter set to destination device 40 before providing any coded video picture described by the sequence parameter set to destination device 40. Moreover, source device 20 may be configured to deny a request for one of movie fragments 112 from destination device 40 when destination device 40 has not first requested data of the sequence data set for the requested one of movie fragments 112.

Figure 5:
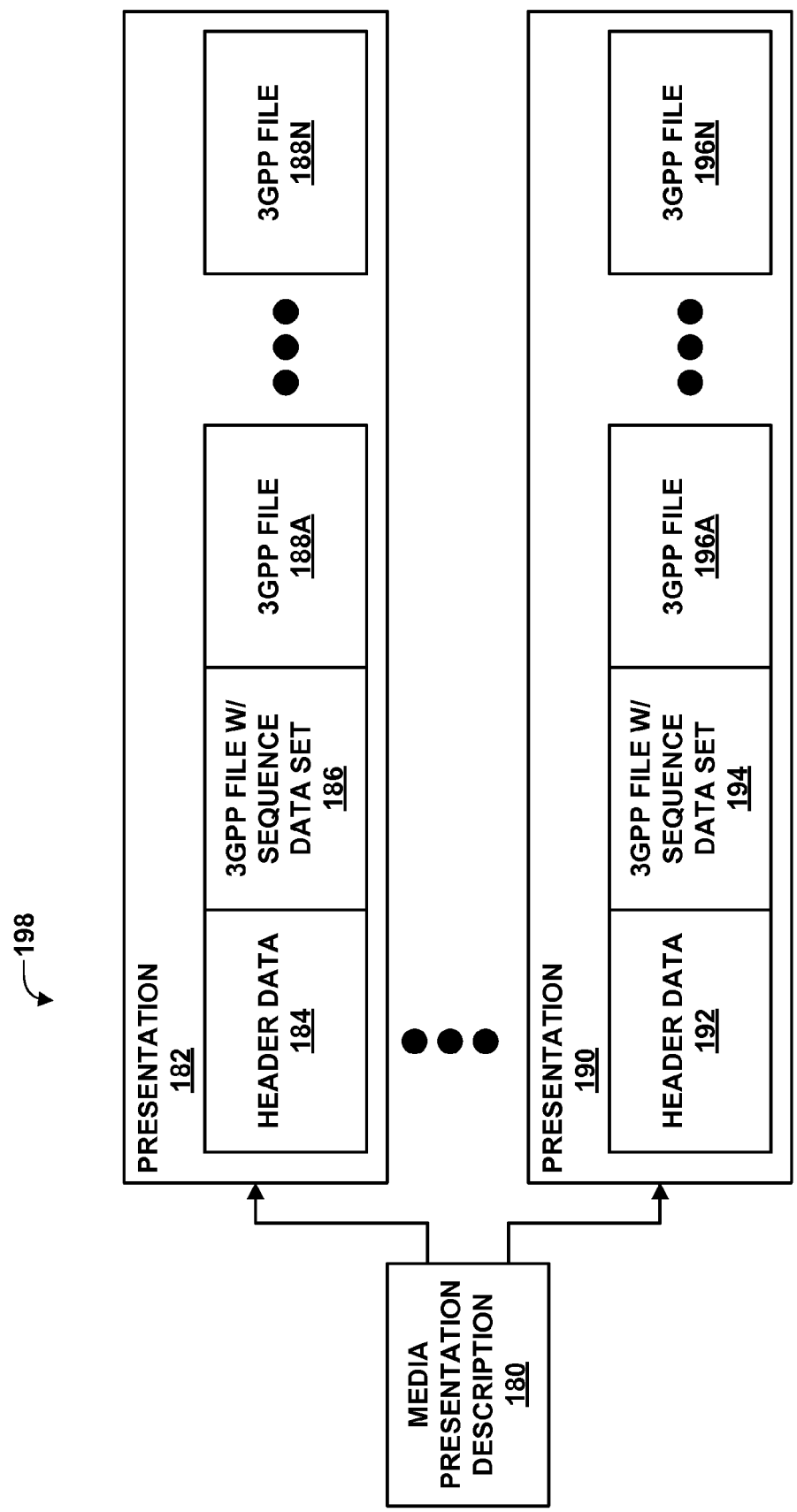
FIG. 5 is a block diagram illustrating an example set of presentations including Third Generation Partnership Project (3GPP) files that include respective sequence data sets for the respective presentations.

FIG. 5 is a block diagram illustrating an example set 198 of presentations 182, 190 including 3GPP files 186, 194 that include respective sequence data sets for the respective presentations. That is, set 198 may include additional presentations, but FIG. 5 depicts two presentations 182, 190 for purposes of example.

Media presentation description (MPD) 180 includes data that describes presentations of set 198, e.g., presentation 182, 190. MPD 180 may describe, for example, a uniform resource locator (URL) and/or a uniform resource name (URN) of a presentation. MPD 180 may further describe characteristics of each of the presentations in set 198. For example, MPD 180 may include sequence data sets for each of the presentations. MPD 180 may also describe a number of 3GPP video files stored in each of the presentations.

In the example of FIG. 5, presentation 182 includes header data 184, 3GPP file with sequence data set 186, and 3GPP files 188A-188N (3GPP files 188). Similarly, in this example, presentation 190 includes header data 192, 3GPP file with sequence data set 194, and 3GPP files 196A-196N (3GPP files 196). Although the letter 'N' is used to designate cardinalities for both 3GPP files 188 and 3GPP files 196, N is not necessarily the same for presentations 182 and 190. That is, there may be a different number of 3GPP files in presentation 182 and presentation 190, as well as any of the presentations of set 198.

Header data 184 may describe certain characteristics of presentation 182, e.g., a number of 3GPP files in presentation 182, memory addresses corresponding to beginnings of each of 3GPP files 188, lengths of 3GPP files 188 (e.g., in bytes), durations of 3GPP files 188 (e.g., in seconds, minutes, etc.), expected decoding and/or rendering capabilities for a client device to properly decode and render 3GPP files 188, or other data. Presentation 182 may include additional data, e.g., as described by the ISO base media file format standard and/or extensions thereof, such the 3GPP standard. 3GPP files 188 may include coded video pictures. 3GPP file with sequence data set 186 includes a sequence data set that describes coded video pictures of a sequence of coded video pictures, e.g., as included in one or more of 3GPP files 188.

In the example of FIG. 5, presentations of set 198 may correspond to various presentations of the same sequence of video data. That is, each of the presentations may be similar during playback, e.g., when decoded and rendered. However, the video data may be coded or presented differently within different presentations of set 198. For example, the video samples of presentation 190 may have a higher or lower resolution, encoded with a higher or lower bitrate, expect a particular decoder buffer size, have a particular frame rate, expect a particular macroblock decoding rate, or be differentiated from each other based on other characteristics. An encapsulation unit, such as encapsulation unit 30 (FIG. 1) may place a sequence data set in a 3GPP file within a presentation, such as 3GPP file 186 of presentation 182 and 3GPP file 194 of presentation 190. Additionally or alternatively, encapsulation unit 30 may store sequence data for one or more presentations of set 198 in MPD 180.

Figure 6:
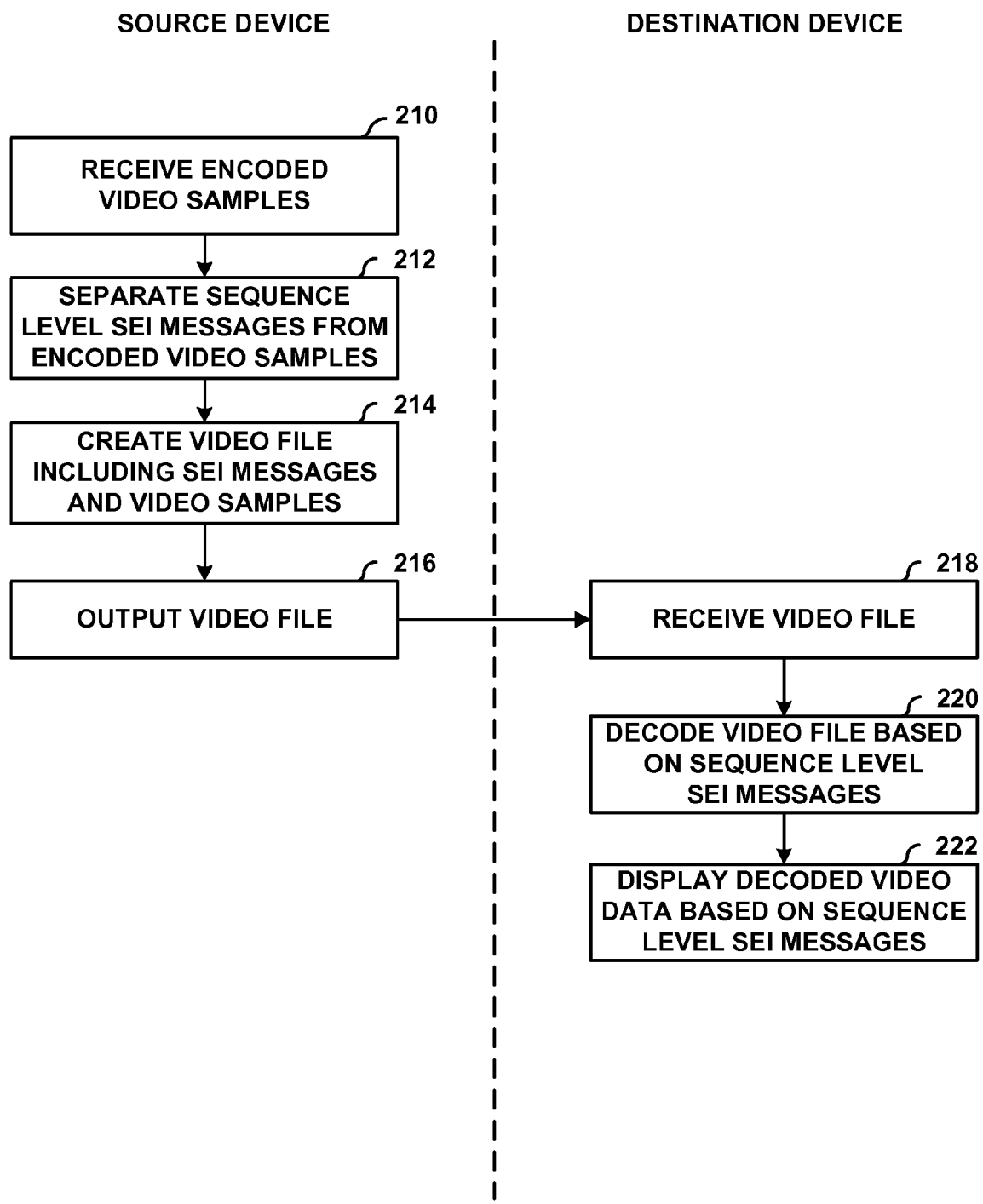
FIG. 6 is a flowchart illustrating an example method for encapsulating a sequence data set within a video file and providing the video file from a source device to a destination device

FIG. 6 is a flowchart illustrating an example method for encapsulating a sequence data set within a video file and providing the video file from a source device to a destination device. Although described with respect to the components of source device 20 and destination device 40 (FIG. 1) for purposes of example and explanation, it should be understood that any suitable device may implement the techniques of FIG. 6.

Initially, encapsulation unit 30 may receive a sequence of encoded video pictures (210). An encoder, such as video encoder 28, may have included sequence level SEI messages with coded samples. Additionally or alternatively, encapsulation unit 30 may create sequence level SEI messages separately from video encoder 28. In any case, encapsulation unit 30 may decouple sequence level SEI messages from coded video pictures described by the sequence level SEI messages (212).

That is, encapsulation unit 30 may create a video file including sequence level SEI messages and coded video pictures described by the sequence level SEI messages (214). In doing so, however, encapsulation unit 30 may store the sequence level SEI messages separately from the coded video pictures described by the sequence level SEI messages. In this manner, the SEI messages may be transmitted and processed separately of the coded video pictures. For example, in accordance with the techniques of this disclosure, encapsulation unit 30 may store the sequence level SEI messages in a parameter set track of the created video file. As another example, encapsulation unit 30 may store the sequence level SEI messages in a track fragment that does not include coded video pictures, a separate 3GPP file that does not include coded video pictures, a data structure similar to a coded video picture but that does not actually include coded video data, in a media presentation description that describes the video file, or otherwise separate the sequence level SEI messages from the coded video pictures described by the sequence level SEI messages.

Encapsulation unit 30 may then output the video file (216). For example, encapsulation unit 30 may cause source device 20 to write the video file to a storage medium, such as, for example, an optical disc, a floppy disk, a flash drive, a hard drive, a solid state drive, or other storage medium. Such storage media may be physically transported to destination device 40. Alternatively, source device 20 may transmit the video file to destination device 40, e.g., via broadcast, network transmission, or other transmission techniques. In any case, destination device 40 may ultimately receive the video file (218).

In some examples, source device 20 may provide distinct portions of the video file to destination device 40, e.g., in response to one or more HTTP-Get or partial-Get requests issued by destination device 40 to source device 20. Destination device 40 may issue a first HTTP-Get or partial-Get request to source device 20 to retrieve a sequence data set, e.g., all or a portion of a parameter set track including sequence level SEI messages, and a second (or more) HTTP-Get or partial-Get request(s) to retrieve coded video pictures described by the sequence data set.

After receiving the video file, destination device 40 may decode the video file based on the sequence level SEI messages (220). That is, video decoder 48 may use data of the sequence level SEI messages to assist in the decoding process. Likewise, video display 44 may use the sequence level SEI messages to assist in rendering of the decoded video data, in order to display the decoded video data (222). For example, video decoder 48 and/or video display 44 (or a rendering unit or rendering engine thereof) may use the sequence level SEI messages to determine how to adapt the video data to a native resolution of video display 44, determine whether an image is a left or right image (e.g., for stereo video data), determine how frames are packed, determine scalability information for the video data, determine multiview acquisition information, and/or determine multiview scene information.

Figure 7:
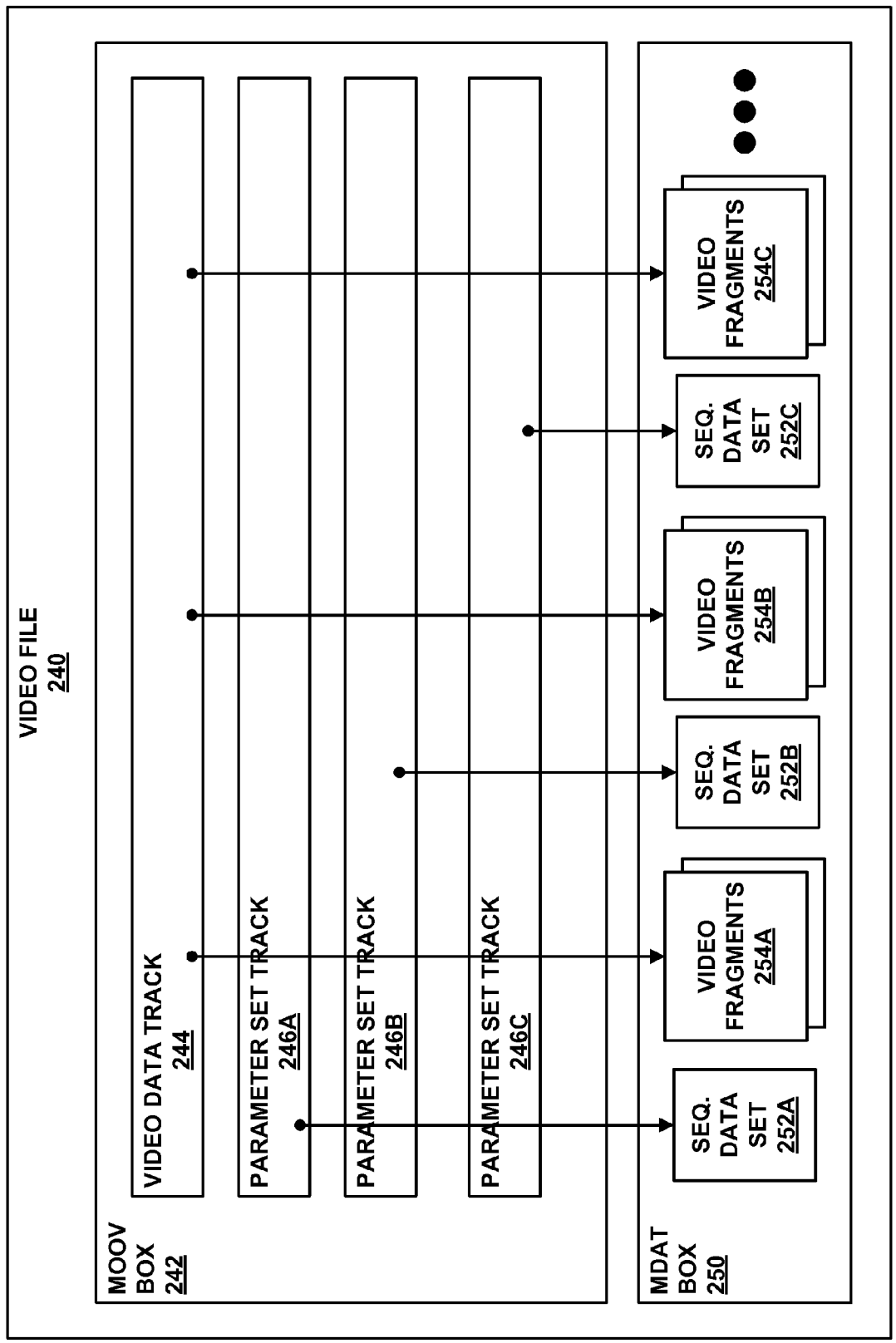
FIG. 7 is a block diagram illustrating another example of a video file that includes multiple sequence data sets.

FIG. 7 is a block diagram illustrating another example of a video file 240. In the example of FIG. 7, video file 240 includes movie (MOOV) box 242 and movie data (MDAT) box 250. MOOV box 242 includes video data track and a number of parameter set tracks 246A-246C. Although three parameter set tracks are illustrated in the example of FIG. 7, it should be understood that a video file may generally include any number of parameter set tracks.

Video data track 244 corresponds to a number of various video fragments 254A-254C, each of which may be stored in MDAT box 250. In this example, each set of video fragments 254A, 254B, and 254C may have different sequence level information. For example, the sequence level information may change between video fragments 254A, 254B, and 254C. Accordingly, each of video fragments 254A, 254B, and 254C may have a respective sequence data set. In this example, sequence data set 252A relates to video fragments 254A, sequence data set 252B relates to video fragments 254B, and sequence data set 252C relates to video fragments 254C.

The sequence data set for a given set of video fragments may apply to each of the video fragments in the sequence. For example, sequence data set 252A may apply to each of video fragments 254A. However, one or more characteristics of video fragments 254B may differ from video fragments 254A. Accordingly, sequence data set 252B may describe the characteristics of video fragments 254B.

Each sequence data set may correspond to a respective parameter set track. In the example of FIG. 7, parameter set track 246A corresponds to sequence data set 252A, parameter set track 246B corresponds to sequence data set 252B, and parameter set track 246C corresponds to sequence data set 252C. Each parameter set track may include data that describes a time during which the corresponding sequence data set applies to video fragments of video data track 244. For example, parameter set track 246A may include data that indicates that sequence data set 252A no longer applies after the time corresponding to the last one of video fragments 254A. This timing information may be UTC time or correspond to a playback duration.

In some examples, a video file may include an additional parameter set track that corresponds to all of video fragments 254A-254C. In such examples, a destination device may utilize data both from the parameter set track that applies to all video fragments and data from the parameter set track that particularly applies to a given video fragment.

Although illustrated for purposes of example as being included in MOOV box 242, it should be understood that sequence data sets 252 may be included in any of the other locations described in this disclosure. For example, sequence data sets may be included in particular video fragments, particular 3GPP files, within a media presentation description, or another location or locations within or associated with a video file.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of receiving encoded video data, the method comprising:
  receiving an initialization segment including encapsulated Supplemental Enhancement Information (SEI) messages that describe a sequence of coded video pictures of a media representation, wherein the SEI messages describe respective ones of the sequence of coded video pictures and include elements common to more than one of the coded video pictures, wherein the initialization segment comprises a first file of a plurality of files of the media representation, wherein the initialization segment is associated with a uniform resource locator (URL), and wherein the first file and the initialization segment do not include any media data;

receiving one or more files of the plurality of files separate from the first file, wherein the one or more files encapsulate the sequence of coded video pictures of the video file and are separate from the first file, and wherein URLs for the one or more files are distinct from the URL with which the initialization segment is associated; and rendering the sequence of coded video pictures based on the SEI messages after the sequence of coded video pictures has been decoded.

2. The method of claim 1, further comprising:

submitting a first request for the SEI messages, wherein receiving the SEI messages comprises receiving the SEI messages in response to the first request; and submitting a second request for the sequence of coded video pictures only after receiving the SEI messages, wherein receiving the sequence of coded video pictures comprises receiving the sequence of coded video pictures in response to the second request.

3. The method of claim 2, wherein the SEI messages comprise a first set of SEI messages, and wherein the sequence of coded video pictures comprises a first sequence of coded video pictures, the method further comprising:

submitting a third request for a second set of SEI messages after receiving the first sequence of coded video pictures;

receiving the second set of SEI messages in response to the third request;

submitting a fourth request for a second sequence of coded video pictures described by the second set of SEI messages;

receiving the second sequence of coded video pictures after receiving the second set of SEI messages; and rendering the second sequence of coded video pictures based on the second set of SEI messages after the second sequence of coded video pictures has been decoded.

4. The method of claim 1, further comprising extracting the SEI messages from at least one of a parameter set track, a track fragment that does not include coded video pictures, and a third generation partnership project (3GPP) format file that does not include coded video data.

5. The method of claim 1, further comprising parsing and decoding the SEI messages, wherein the SEI messages are coded separately from access units comprising the sequence of coded video pictures.

6. An apparatus for receiving encoded video data, the apparatus comprising:

a control unit configured to:

receive an initialization segment including encapsulated Supplemental Enhancement Information (SEI) messages that describe a sequence of coded video pictures of a media representation, wherein the SEI messages describe respective ones of the sequence of coded video pictures and include elements common to more than one of the coded video pictures, wherein the initialization segment comprises a first file of a plurality of files of the media representation, wherein the initialization segment is associated with a uniform resource locator (URL), and wherein the first file and the initialization segment do not include any media data, and receive one or more files of the plurality of files separate from the first file, wherein the one or more files encapsulate the sequence of coded video pictures of the video file and are separate from the first file, and wherein URLs for the one or more files are distinct from the URL with which the initialization segment is associated; and a video output configured to render the sequence of coded video pictures after the sequence of coded video pictures has been decoded.

7. The apparatus of claim 6, wherein the control unit is configured to submit a first request for the SEI messages, receive the SEI messages in response to the first request, submitting a second request for the sequence of coded video pictures only after receiving the SEI messages, and receive the sequence of coded video pictures in response to the second request.

8. The apparatus of claim 7, wherein the SEI messages comprise a first set of SEI messages, and wherein the sequence of coded video pictures comprises a first sequence of coded video pictures, wherein the control unit is configured to submit a third request for a second set of SEI messages after receiving the first sequence of coded video pictures, receive the second set of SEI messages in response to the third request, submit a fourth request for a second sequence of coded video pictures described by the second set of SEI messages, and receive the second sequence of coded video pictures after receiving the second set of SEI messages, and wherein the video output is configured to render the second sequence of coded video pictures based on the second set of SEI messages after the second sequence of coded video pictures has been decoded.

9. The apparatus of claim 6, wherein the control unit is configured to extract the SEI messages from at least one of a parameter set track, a track fragment that does not include coded video pictures, and a third generation partnership project (3GPP) file that does not include coded video data.

10. The apparatus of claim 6, wherein the apparatus comprises at least one of:

an integrated circuit;

a microprocessor; and a wireless communication device that includes the control unit.

11. An apparatus for receiving encoded video data, the apparatus comprising:

means for receiving an initialization segment including encapsulated Supplemental Enhancement Information (SEI) messages that describe a sequence of coded video pictures of a media representation, wherein the SEI messages describe respective ones of the sequence of coded video pictures and include elements common to more than one of the coded video pictures, wherein the initialization segment comprises a first file of a plurality of files of the media representation, wherein the initialization segment is associated with a uniform resource locator (URL), and wherein the first file and the initialization segment do not include any media data;

means for receiving one or more files of the plurality of files separate from the first file, wherein the one or more files encapsulate the sequence of coded video pictures of the video file and are separate from the first file, and wherein URLs for the one or more files are distinct from the URL with which the initialization segment is associated; and means for rendering the sequence of coded video pictures based on the SEI messages after the sequence of coded video pictures has been decoded.

12. The apparatus of claim 11, further comprising:
means for submitting a first request for the SEI messages, wherein the means for receiving the SEI messages comprises means for receiving the SEI messages in response to the first request; and
means for submitting a second request for the sequence of coded video pictures only after receiving the SEI messages, wherein the means for receiving the sequence of coded video pictures comprises means for receiving the sequence of coded video pictures in response to the second request.

13. The apparatus of claim 12, wherein the SEI messages comprise a first set of SEI messages, and wherein the sequence of coded video pictures comprises a first sequence of coded video pictures, the apparatus further comprising:
means for submitting a third request for a second set of SEI messages after receiving the first sequence of coded video pictures;
means for receiving the second set of SEI messages in response to the third request;
means for submitting a fourth request for a second sequence of coded video pictures described by the second set of SEI messages;
means for receiving the second sequence of coded video pictures after receiving the second set of SEI messages; and
means for rendering the second sequence of coded video pictures based on the second set of SEI messages after the second sequence of coded video pictures has been decoded.

14. The apparatus of claim 13, further comprising means for extracting the SEI messages from at least one of a parameter set track, a track fragment that does not include coded video pictures, and a third generation partnership project (3GPP) file that does not include coded video data.

15. A computer program product comprising a non-transitory computer-readable medium having stored thereon instructions that, when executed, cause a processor of an apparatus for receiving encoded video data to:
receive an initialization segment including encapsulated Supplemental Enhancement Information (SEI) messages that describe a sequence of coded video pictures of a media representation, wherein the SEI messages describe respective ones of the sequence of coded video pictures and include elements common to more than one of the coded video pictures, wherein the initialization segment comprises a first file of a plurality of files of the media representation, wherein the initialization segment is associated with a uniform resource locator (URL), and wherein the first file and the initialization segment do not include any media data;
receive one or more files of the plurality of files separate from the first file, wherein the one or more files encapsulate the sequence of coded video pictures of the video file and are separate from the first file, and wherein URLs for the one or more files are distinct from the URL with which the initialization segment is associated; and
render the sequence of coded video pictures based on the SEI messages after the sequence of coded video pictures has been decoded.

16. The computer program product of claim 15, further comprising instructions to:
submit a first request for the SEI messages, wherein the instructions to receive the SEI messages comprise instructions to receive the SEI messages in response to the first request; and
submit a second request for the sequence of coded video pictures only after receiving the SEI messages, wherein the instructions to receive the sequence of coded video pictures comprise instructions to receive the sequence of coded video pictures in response to the second request.

17. The computer program product of 16, wherein the SEI messages comprise a first set of SEI messages, and wherein the sequence of coded video pictures comprises a first sequence of coded video pictures, further comprising instructions to:
submit a third request for a second set of SEI messages after receiving the first sequence of coded video pictures;
receive the second set of SEI messages in response to the third request;
submit a fourth request for a second sequence of coded video pictures described by the second set of SEI messages;
receive the second sequence of coded video pictures after receiving the second set of SEI messages; and
render the second sequence of coded video pictures based on the second set of SEI messages after the second sequence of coded video pictures has been decoded.

18. The computer program product of 15, further comprising instructions to extract the SEI messages from at least one of a parameter set track, a track fragment that does not include coded video pictures, and a third generation partnership project (3GPP) format file that does not include coded video data.

* * * * *